Aug. 10, 1954  E. VAN HAAFTEN  2,685,924
PARACHUTE RELEASE MECHANISM
Filed Feb. 20, 1951
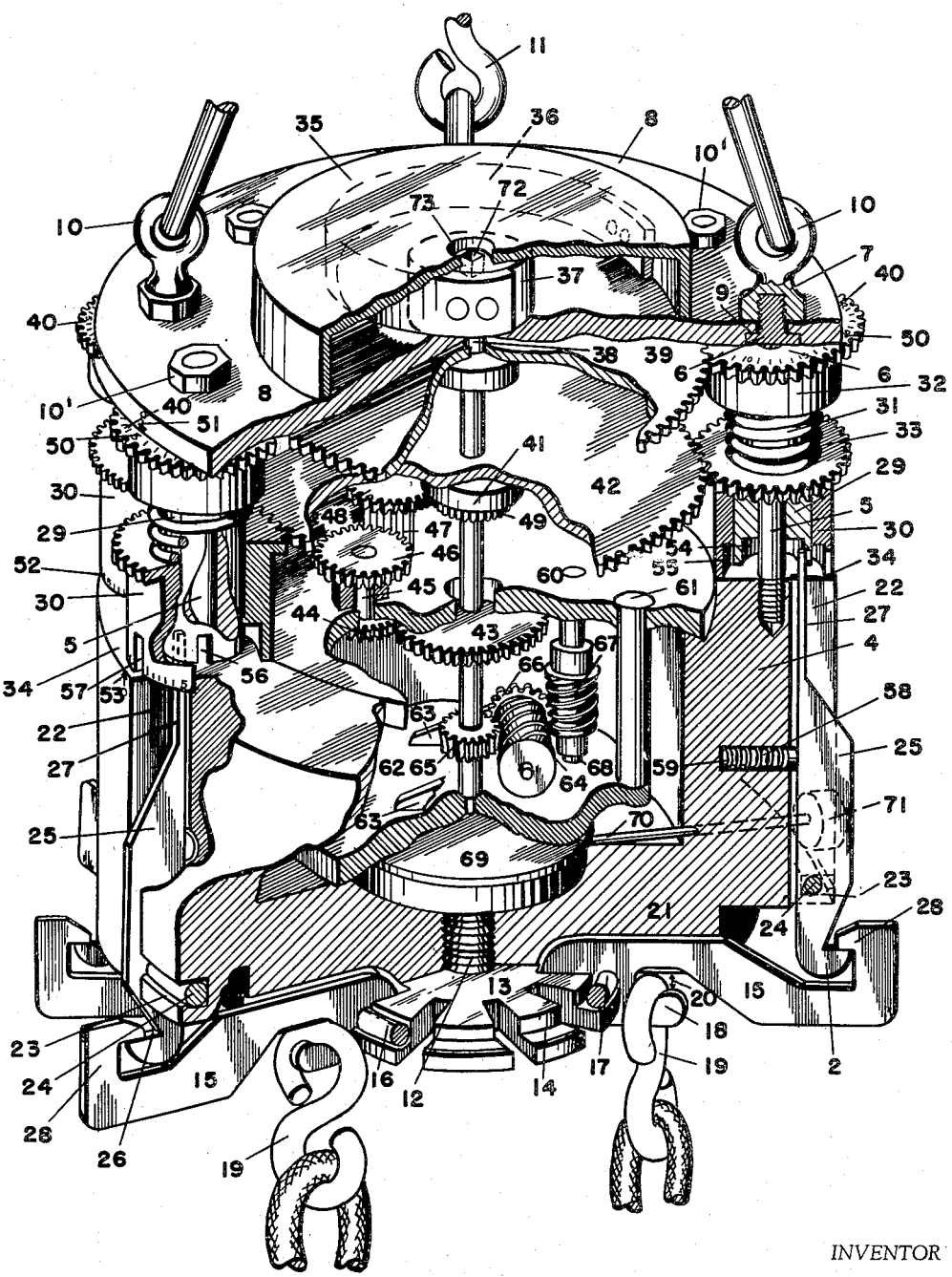
INVENTOR
EGBERT VAN HAAFTEN
BY  M. W. Gould
ATTORNEY

Patented Aug. 10, 1954

2,685,924

UNITED STATES PATENT OFFICE 2,685,924

PARACHUTE RELEASE MECHANISM

Egbert Van Haaften, Lancaster Township, Lancaster County, Pa., assignor to Hamilton Watch Company, Lancaster, Pa.

Application February 20, 1951, Serial No. 211,891

6 Claims. (Cl. 161—1)

1

This invention relates to a releasing mechanism for a plurality of parachutes, where the parachutes are released at varying intervals of time.

The object of the present invention is to provide a mechanism which may be attached to a free traveling balloon designed to ascend into the stratosphere and which through timing mechanisms will release from one to ten parachutes at varying intervals of time.

A further object of the present invention is to provide a parachute releasing means which can be quickly and easily set to release from one to ten parachutes and their loads at varying intervals of time.

It is a still further object of the present invention to provide a mechanism which will be comparatively inexpensive to manufacture so that said mechanism may be expendable.

It is a further object of the present invention to provide a mechanism which will operate in extremes of temperatures and one in which practically no lubrication of the moving parts is necessary.

The invention is shown in the accompanying drawing in which the figure is a broken perspective view showing the entire mechanism.

Referring more particularly to the drawing, a hollow cylindrical body portion 4 closed at one end has a plurality of bolts 5 threaded therein. In the illustration shown there are ten of these bolts which extend upward from the upper open end of the body portion. The upper end of each of the bolts 5 is provided with an annular shoulder and washers 6 and a threaded end 7. A cover plate 8 is recessed at 9 to receive each of the washers 6, while an eye nut 10 is threaded to the end 7 of the bolt and firmly clamps the plate between said nut and said annular washers. If desired, only every other one of the nuts need be an eye nut, a regular nut 10' being used on alternate bolts. Connected to the eye bolts 10 are hangers 11 which serve to suspend the mechanism from a baloon or other apparatus.

Secured to the cap end of the hollow cylindrical body portion by a bolt 12 is a notched disc 13 formed with an annular shoulder 14. Parachute supporting substantially S-shaped lever hooks 15 are carried in each of the slots and pivotally mounted beyond the S-portion by

2 means of a wire 16 passing through holes 17 in that portion of the lever beyond the S-portion and resting on the shoulder 14. The S-shaped lever hook is pivoted so that the curl of the S forms an upper hook and a lower hook, the lever being pivoted beyond the lower hook. The end of the lower hook 18 is thickened to prevent the escape of an S-link 19 which supports the parachute and apparatus to be dropped, by engagement with the outer surface of the cap end of the cylindrical body portion, the space 20 between the end 18 of the S-shaped hook and the outer surface of the cap portion 21 being smaller than the diameter of the S-link 19. This is a particularly important feature as the parachutes and their load will probably be held at an angle tending to pull the S-shaped link from the supporting hook.

The cylindrical body portion 4 is formed with a plurality of longitudinal slots 22 and an annular groove 23. The groove 23 is formed within the cap end of the body portion 4 and extends between and into the vertical slots. A wire 24 housed within the annular groove serves as a pivot for a plurality of release levers 25 which are substantially housed within the slots 22.

These release levers are formed with a notch 26 at the lower end and a reduced finger portion 27 at the upper end, the lower notch engaging the upper hook 28 of the S-shaped lever 15, while the finger portion 27 is retained by a pair of rotating cylinders.

These cylinders which are preferably formed of nylon or Bakelite are mounted concentrically on the bolts 5, said bolts serving as a bearing for the outer cylinder 30. The plate 8 is supported on the washers 6 of the bolts 5 so that the cylinders 29 and 30 rotate freely, the one on the bolt 5 and the other on the cylinder, while a spring 31 engaging the underside 32 of the inner cylinder and the upper side of a gear wheel 33 of the outer cylinder forces the inner cylinder into contact with the upper plate 8 and the outer cylinder into contact with the upper edge 34 of the cylindrical body portion.

Centrally mounted on the top plate 8 is a cap 35 which houses a spring 36 secured at its inner end to an arbor 37 which is mounted on a central shaft 38. Shaft 38 has keyed thereto a central gear 39 which is in mesh with each of the gears 40 which are integral with the inner cylinder 29. It will thus be seen that less than half of a rotation of gear 39 will impart a full and complete rotation to each of the gears 40.

A boss 41 having an integral gear 49 is mounted for free rotation on the central shaft 38 and supports and carries a central gear 42. The boss 41, gear 49, and supported gear 42 is incapable of vertical movement on the shaft 38 being seated against a shoulder turned on said shaft or in some similar fashion prevented from vertical movement while being permitted free rotation on said shaft, said construction not shown in detail. The gear 43 keyed to shaft 38 meshes with a pinion 44 carried on the shaft 45 which also supports gear 46. Gear 46 meshes with pinion 47 which carries gear 48 in mesh with gear 49, which is integral with the boss 41 and rotates gear 42. Gear 42 is in mesh with each of gears 33 which in turn are part of the outer cylinder 30. It will thus be seen that through the gear train 43, 44, 46, 47, 48, 49—42 that the gears 33 turn in the ratio of 60 to 1 with regard to the gears 40. It is then easily understood that a single rotation of the gears 40 means 60 rotations of the gears 33 and if the gears 40 are divided into sixty graduations, as shown at 50, then the movement of a single graduation past the zero mark 51 will result in a complete rotation of the gear 33, and if the gear 33 is marked with the graduations 52, each interval between the graduations with regard to the zero mark 53 will indicate one minute. With this one minute as a basis, a complete rotation of the upper gear 40 will indicate the passage of sixty hours of time.

By moving the upper gear 40 and its companion inner cylinder 29 downward against the action of the spring 31, the gear 40 is thrown out of mesh with the gear 39 and may be freely rotated so that any indication on the graduation scale 50 may be brought opposite the zero mark 51. In a like manner upward movement of the gear 33 against the spring 31 will remove the gear 33 from mesh with the gear 42 and free rotation of the gear 33 will permit setting of that gear with regard to the zero mark 53. It will thus be seen that each individual releasing mechanism may be quickly and easily set to be released at any time from one minute to sixty hours after setting.

The cylinders 29 and 30 are respectively formed with a recessed portion 54 and 55 and a longitudinal slot 56 and 57. When the rotation of the inner cylinder brings the slot 56 opposite the finger 27, a spring 58 mounted in a hole 59 formed in the body portion 4 and communicating with the back of the slots 22 bears against the release lever 25 and forces the finger portion 27 through the slot 56 and into engagement with the inner wall of the cylinder 30. Subsequent rotation of the cylinder 30 permits the escape of the finger 27 through the notch 57 which permits the lever 25 to pivot on the wire 24 releasing the S-hook 28 from the notch 26 which drops the S-shaped lever hook 15 about the pivot wire 16 and permits the escape of the S-link 19 through the opening 20. It is possible with this mechanism to release any one or any number of the parachutes at any desired time within sixty hours after setting the mechanism.

The upper inner edge of the body portion 4 is formed with a recessed shoulder to receive a plate 60 which serves as a support for the gears 44, 46, 47, 48 and for the posts 61 which in turn support a plate 62. The plate 62 serves as a bottom bearing for the shaft 38 and carries end plates 63 which support worm 64 and worm wheel 66. The worm 64 engages the worm wheel 65 which is keyed to the shaft 38, and serves to govern the torque of the spring 36. Integral with the worm 64 is a worm wheel 66 which in turn connects to the worm 67 mounted on the shaft 68 and connected to the barrel of a 35-size watch movement 69. The rotation of this barrel (not shown) is controlled by the ordinary watch movement which is wound by a stem 70 and a crown 71 projecting from the lower end of the body portion 4. A suitable mechanism is provided so that longitudinal movement of the stem 70 will start the operation of the watch movement 69 and rotate the worm 67, the worm wheel 66, worm 64 and permit rotation of worm wheel 65.

In use the timing cylinders 29 and 30 are set by first depressing the inner cylinder or upper graduated gear 40 against the spring 31 and rotating with reference to the zero reading 51 for the desired elapsed number of hours. The outer cylinder 30 or lower gear wheel 33 is then moved upward against the action of the spring 31 and out of mesh with the gear 42 and rotated until the graduations 52 on the lower part of the cylinder are brought to the desired reading against the zero mark 53 and the number of minutes after the elapsed hours is established so that each and every parachute may be set for release at any elapsed time period from one minute to sixty hours.

A crank or suitable key is then inserted in the square hole 72 in the arbor 37 through the opening 73 in the housing 35 and the spring 36 wound. The torque of the spring 36 is arrested by the worm 64 so that the wound spring 36 is held ready to deliver power. By means of the crown 71 and the stem 70 the watch movement 69 is wound. A mechanism (not shown) within the watch movement 69, such as a spring to engage the balance wheel and prevent rotation of said balance wheel holds the watch movement from starting until longitudinal movement of the stem 70 releases the balance wheel and starts said watch movement, which through the rotation of the barrel or a suitable gear connected to the barrel rotates the worm 67 which in turn rotates the worm 64 through the worm gear 66 and permits rotation of the worm gear 65. It will thus be seen that the watch movement 69 serves as a governor or escape valve, permitting the movement of the worm gear 65, which is rotated by the influence of spring 36, to turn at a rate governed by the rotation of the worm 67 which in turn is rotated by the barrel of the watch movement 69.

Rotation of the worm 65 allows the shaft 38 and its keyed gear 39 to rotate. This rotation is extremely slow, the gear 39 making less than half a rotation for a complete sixty hour run. Rotation of the gear 39 through its entire arc will rotate the gears 40 one revolution corresponding to sixty hours of time. Rotation of the shaft 38 also rotates the gear 43 which motion is transferred to the gear 44 and in turn 46, 47, 48, 49 and its accompanying gear 42. The rotation of gear 42 turns the minute gears 33 which are geared to turn sixty times as fast as the gears 40 so that one rotation of the gear 33 is equal to the movement through the angle occupied by one tenth of the gear 40. With the zero indication on the hour wheel coinciding with the zero mark 51, the slot 56 falls opposite the finger 27 of the release lever 25 permitting the passage of the finger due to the action of the spring 59 through the slot 56 and into engagement with the inner wall of the outer cylinder 30. Further rotation of the outer cylinder brings its zero readings to a point of coincidence and aligns the slot 57 with the finger 27 permitting the escape of the release lever and its pivotal motion about the wire 24.

The pivotal motion of the release lever 25 releases the upper S-shaped hook of the S-shaped lever hook from the notch 26 and allows the lever hook 28 to pivot about the wire 16 and permitting the release of the S-link 19 with its accompanying parachute. In a similar manner each of the other parachutes are released after the desired elapsed time interval.

What is claimed is:

1. A multiple parachute release device comprising a cylindrical body portion closed at one end, parachute holding means secured to the closed end of said body portion, releasing means for said parachute holding means secured to said body portion adjacent said closed end, said releasing means extending upward and parallel to said body portion, a series of upstanding bolts extending from the open end of said body portion in parallel relation to said side, a plurality of rotatable cylinders mounted on said bolts, a plurality of rotatable larger cylinders mounted on said smaller cylinders, said cylinders engaging said releasing means, means for rotating all of said cylinders, the larger of said cylinders being driven sixty times as fast as the smaller of said cylinders, means for governing said driving means to control the rotation of said rotatable cylinders, and means governed by the annular position of said rotatable cylinders for releasing said releasing means.

2. A multiple parachute release device comprising a cylindrical body portion closed at one end, means for supporting a multiplicity of parachutes pivotally secured to said body adjacent said closed end, releasing levers pivotally mounted in said body portion, one end of said levers engaging said parachute holding means, a plurality of bolts upstanding from the open end of said body portion in parallel relation to the sides of said body portion, a plurality of rotatable cylinders carried on said bolts, a plurality of larger cylinders rotatably carried on said first mentioned cylinders, each of said cylinders being formed with an escape notch, said cylinders receiving the free ends of said release levers and adapted to release said release levers upon coincidence of the lever position with the notch, means for driving said smaller and larger cylinders, said larger cylinder being driven at sixty times the speed as said smaller cylinder, means for governing said driving means, means for temporarily releasing said cylinders from engagement with said driving means to manually set said cylinders to different initial positions, subsequent rotation of said cylinders bringing the escape notches into coincidence with said release levers to respectively and in turn release said levers from said cylinders, permitting said levers to release said parachute holding means at a time governed by the manual setting of said cylinders.

3. A multiple parachute release device comprising a cylindrical body portion closed at one end, parachute supporting means pivotally secured to the closed end of said body portion, release levers pivotally secured to said body portion, one end of said levers engaging said parachute holding means, a plurality of bolts extending from the open end of said body portion in parallel relation to the side of said body portion, cylinders mounted for rotation on said bolts, larger cylinders mounted for rotation on said smaller cylinders, said cylinders being permitted restricted longitudinal motion along said bolt, gears mounted on the top of said cylinders, means for normally forcing said gears away from each other, means for rotatably driving said cylinders, said means consisting of a train of gears engaging the gears of said cylinders to drive the larger of said cylinders sixty times faster than the smaller of said cylinders, means for controlling the rotation of said train of gears, the longitudinal movement of said cylinders permitting manual disengagement of said cylinder gears with said train of gears to permit initial setting of said cylinders with relation to a zero setting position, said smaller and larger cylinders engaging the free ends of said release levers, each of said cylinders being formed with a notch which upon coincidence with the position of said release levers will release said levers and in turn said parachute holding means.

4. A multiple parachute release device according to claim 3, wherein a watch and a worm drive is used to control the rotation of said gear train.

5. A multiple parachute release device comprising a cylindrical body portion closed at one end, a bolt having an enlarged head formed with a plurality of radial slots secured to the closed end of said cylindrical body, S-shaped levers pivotally mounted in each of said slots, parachute supporting means held by each of these S-shaped levers, a plurality of release levers pivotally mounted in the side of said cylindrical body portion, one end of said levers engaging and holding the S-shaped levers in parachute supporting position, a plurality of bolts threaded into the upper open end of said cylindrical body portion, an hour cylinder supported on said bolts for free rotation, a minute cylinder supported on said hour cylinder for free rotation, a timing mechanism having gears for operating said hour cylinder and said minute cylinder, gears on said hour cylinder and said minute cylinder in engagement with certain of said timing gears, said minute and hour cylinders being formed to normally retain the free end of said release levers except at one certain point in the circumference of said cylinders formed with a notch to release said lever, means for urging said release levers outward from said timing cylinders to effectively release said lever when opposite said notches, the release of said end pivoting said release lever and releasing said S-shaped lever to release said parachute supporting means.

6. A multiple parachute release device comprising a cylindrical body portion closed at one end, a bolt having an enlarged head formed with a plurality of radial slots secured to the closed end of said cylindrical body, S-shaped levers pivotally mounted in each of said slots, parachute supporting means held by each of these S-shaped levers, a plurality of release levers pivotally mounted in the side of said cylindrical body portion adjacent the closed end, one end of said levers engaging and holding the S-shaped levers in parachute supporting position, a plurality of bolts threaded into the upper end of said cylindrical body in parallel relation to the side of said body, an hour cylinder rotatably mounted on each of said bolts, a minute cylinder rotatably mounted on said hour cylinder, gears carried on each of said cylinders, said cylinders being mounted on said bolts to permit restricted longitudinal movement, a coil spring normally forcing said cylinders apart, to the extent of their longitudinal motion, a driving mechanism, a train of gears connected to said driving mechanism, means for controlling the movement of said train of gears, certain of said gears in the train being connected to the hour and minute cylinders to turn the minute cylinder sixty times faster than the hour cylinder, the longitudinal movement of said gears being such as to permit manual disengagement of the minute and hour gears with said gear train to permit initial setting, said minute and hour cylinders being formed to retain the free end of said release levers, and a notch formed in said cylinders to release said release levers upon coincidence of the position of said release levers with the notch of the cylinders, a coil spring bearing against each of said release levers to urge said levers against the inward side of said cylinders during rotation of said cylinders, the release of said release levers releasing said S-shaped parachute holding levers.

References Cited in the file of this patent

UNITED STATES PATENTS

| Number | Name | Date |
|---|---|---|
| 676,345 | Torras | June 11, 1901 |
| 2,504,492 | Brown | Apr. 18, 1950 |
| 2,534,866 | Hakomaki | Dec. 19, 1950 |